INVENTOR:
KENNETH PICKLES
BY
NORRIS + BATEMAN, atty

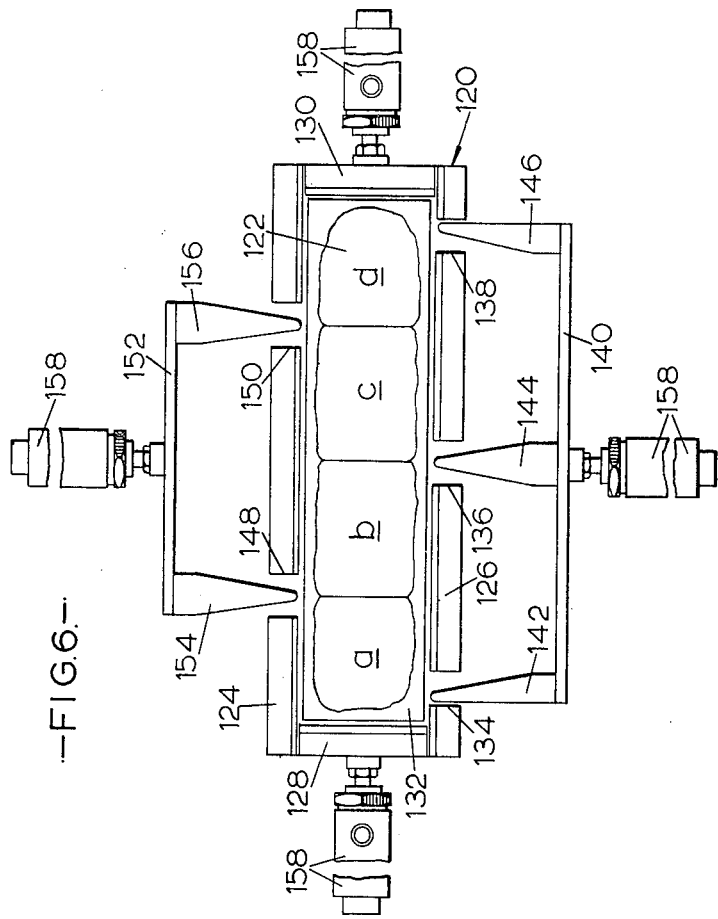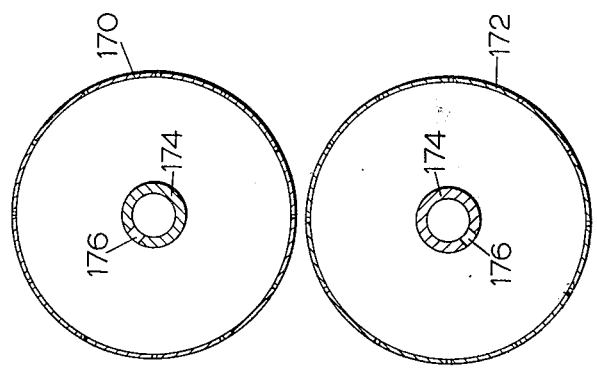

United States Patent Office 3,507,227
Patented Apr. 21, 1970

3,507,227
DOUGH MANIPULATION MACHINES
Kenneth Pickles, Burnley, England, assignor to Tweedy of Burnley Limited, Burnley, Lancashire, England, a corporation of Great Britain
Filed Oct. 31, 1967, Ser. No. 679,493
Claims priority, application Great Britain, Nov. 5, 1966, 49,688/66
Int. Cl. A21d 8/08; A21c 1/14
U.S. Cl. 107—9
15 Claims

ABSTRACT OF THE DISCLOSURE

Apparatus for handling soft tacky dough of the type which has a tendency to stick to metal and like surfaces with which it comes in contact comprising three dough manipulators adapted to simultaneously engage respectively the ends and an intermediate portion of the dough body for folding the dough body, these manipulators having gas permeable dough contacting surfaces contacting the dough body. Gas under pressure is supplied to discharge through the gas permeable surfaces for establishing and maintaining a continuous lubricant film of gas between the dough body and each of the manipulator surfaces during folding of the dough body.

From its formation in a dough mixer to its seating in a pan for proving and/or baking, dough has to be manipulated to produce bread of the desired shape and of satisfactory cell structure. There are various problems associated with dough manipulation, one of the most important being that created by the tendency of dough to stick to manipulating surface. The primary object of this invention is to provide an improved dough manipulation machine in which the difficulty of dough sticking to the manipulating surfaces is reduced.

Besides the breadmaking industry, dough is formed for other purposes (i.e. in the plastics industry) and in this specification and the claims the word "dough" is used to describe any tacky plastic material of a kind similar to the dough familiar in breadmaking.

According to this invention a dough manipulating machine has a gas-permeable manipulating member, and apparatus for supplying gas under pressure out through the operative surface of the manipulating member. A series of spaced apart holes may be formed through the operative surface to provide the permeability, or the manipulating member may be made of inherently gas-permeable material, but in either event, the arrangement of the manipulating member and its gas supplying apparatus is such that a substantially continuous film of gas is formed over any part of the operative surface against which a piece of dough is engaged, so that the dough rests on a "lubricating" film of gas.

The term "manipulating surface" is used, because the invention is capable of application to any surface of the machine against which the dough engages during the handling process. Obviously, it is intended to include articles such as folding plates, but it also includes stationary walls and dough rollers.

According to a preferred feature of the invention, a manipulating surface is made of air permeable plastics material. If this material has the required mechanical strength, it may be formed into self sustaining walls. Otherwise, it may be used as a covering for walls giving the required mechanical strength.

According to the invention dough is manipulated by a gas permeable manipulating member applied with a gas under pressure so that the gas escapes from a surface of the manipulating member which would otherwise be engaged by the dough and produces a "lubricating" film of gas between the dough and that surface of the manipulating member.

Figure 1:
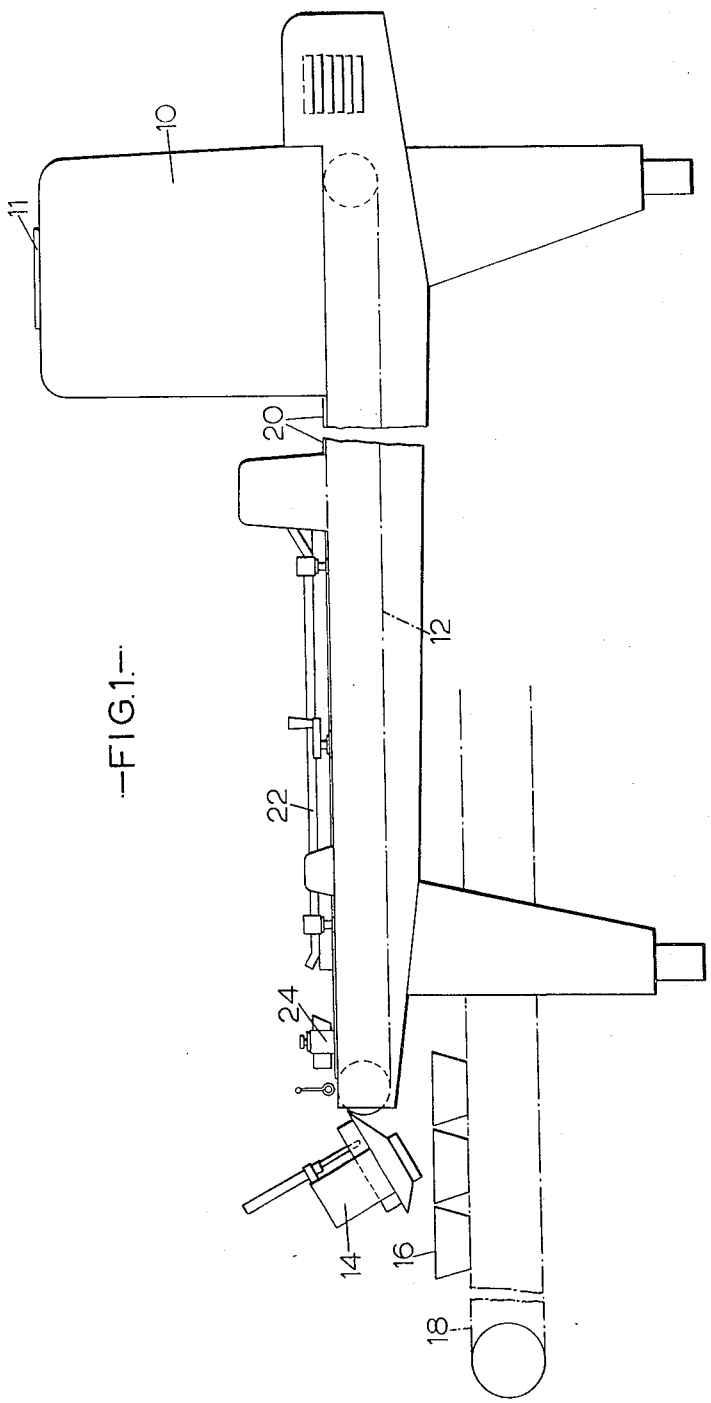
Figure 2:
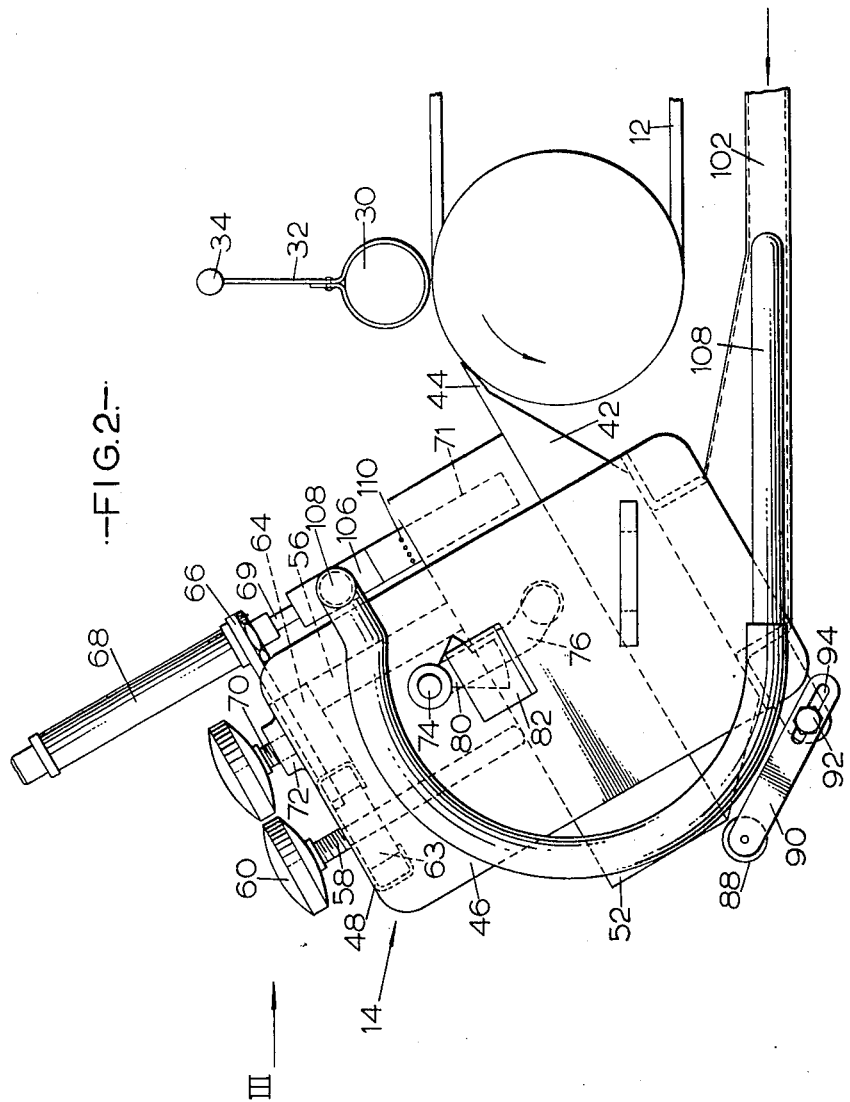
Figure 3:
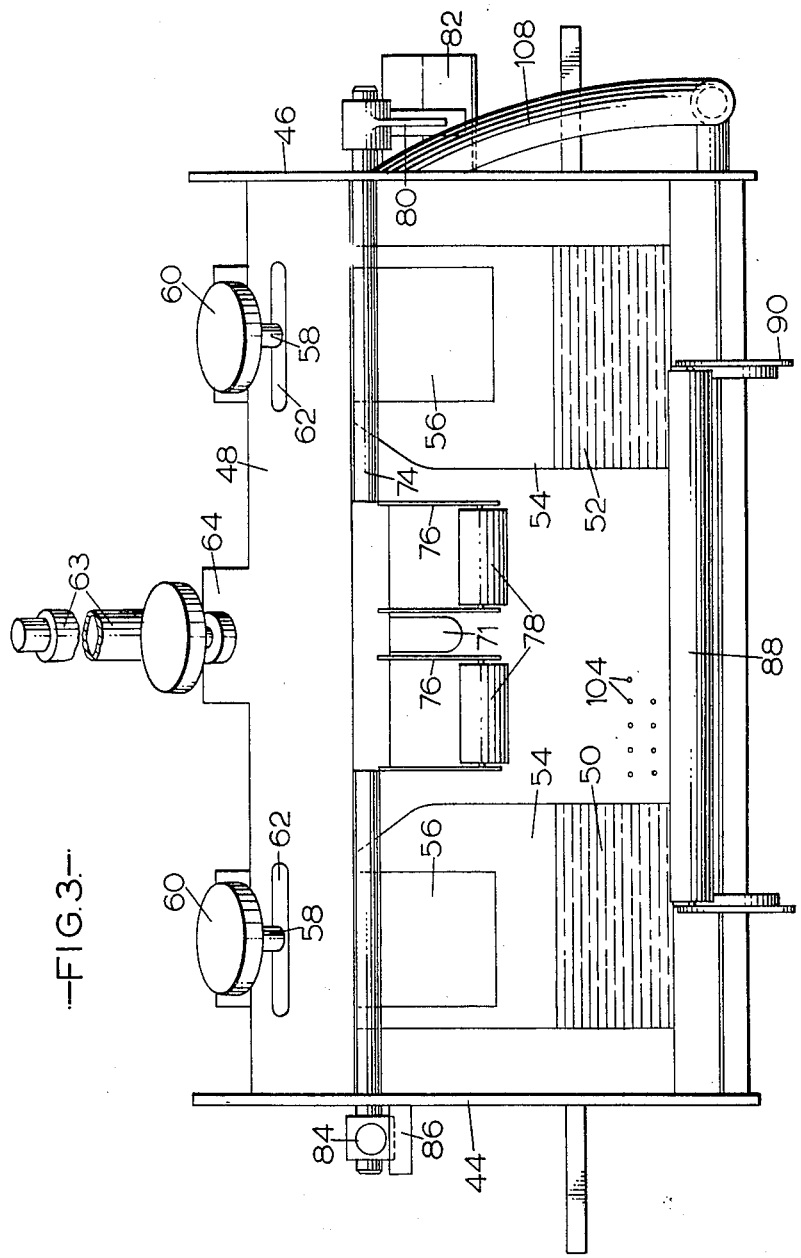
Figure 4:
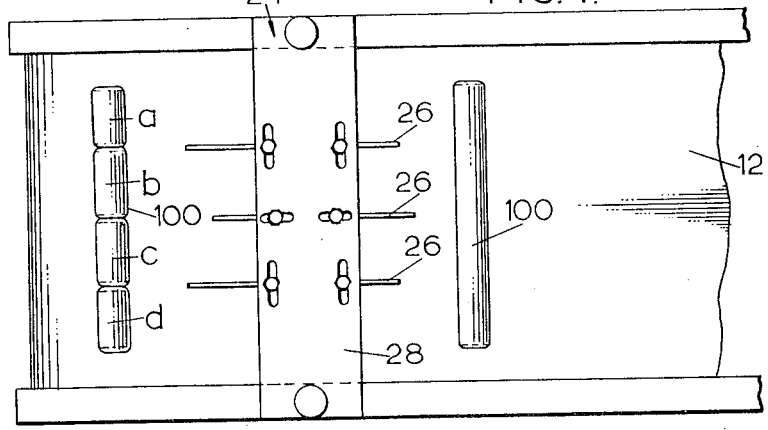
Figure 7:
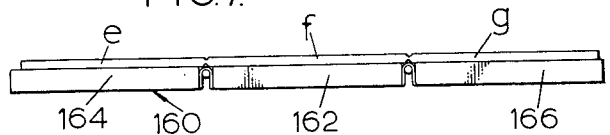
Figure 5:
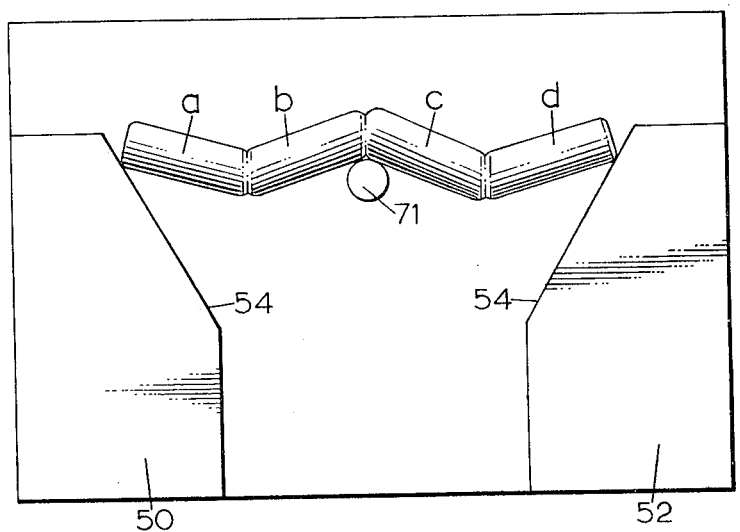

Four arrangements of dough manipulating machines and their method of operation in accordance with the invention will now be described by way of examples only, with reference to the accompanying drawings in which:

FIGURE 1 is a side view of a dough moulder,

FIGURE 2 is an end view of a dough folding machine fitted at the end of the dough moulder, FIGURE 3 is a view in the direction of the arrow III in FIGURE 2, FIGURE 4 is a diagrammatic plan view showing a method of slitting the dough piece, FIGURE 5 is a diagrammatic plan view of the folding machine showing the formation of the dough piece, FIGURE 6 is a plan view of an alternative form of dough folding machine, FIGURE 7 is a diagrammatic representation of another dough folding machine for folding sheeted dough, and FIGURE 8 is an end view of a pair of sheeting rollers on a dough moulder.

In general it will be noted that the examples here described are all concerned with breadmaking and that they are all parts of the dough forming apparatus used between the mixing and the panning stages of the breadmaking process. It should be understood that the invention is not restricted in its application either (a) to the dough moulding process in breadmaking or (b) to the breadmaking industry. Therefore the invention can be applied to other processes and industries where it is necessary to handle a piece of "dough" (as previously defined).

Referring to FIGURE 1, there is illustrated a dough moulder of a type which is well known in the breadmaking art, and which therefore need not be described in detail. Dough in lump form is fed into a headstock 10 through an opening 11, and within the headstock it passes between rollers (not shown) which squeeze the dough out into a flat sheet. This dough then travels along an endless belt conveyor 12 towards the rear end of the moulder, where it passes through a dough folder 14 before dropping into a pan 16 on a pan conveyor 18.

During its travel along the belt 12, the sheet of dough first passes under a chain mail coiler 20 which rolls the sheet of dough into an elongated cylindrical shape. This rolled dough piece is then carried under a pressure board 22 which gradually approaches the surface of the conveyor belt 12, so that the dough is caused to roll tighter. The effect of the sheeting and rolling is to produce a cellular structure in the dough, each cell being somewhat elongated in the direction of the longitudinal axis of the dough cylinder.

For some qualities of bread, it is necessary to sever the dough cylinder into a plurality of pieces (usually four) of equal length and then to position these in the pan with their lengths across the width of the pan. The elongated cells of the dough then extend laterally of the pan and this is desirable, because when the loaf is baked and cut, it will have a smooth texture. The process of cutting the dough cylinder and turning the separate pieces through 90° as they are placed in the pan is known in the trade as cross-panning. The dough folder 14 is provided to carry out cross-panning automatically.

A slitter 24 is fitted across and above the conveyor belt 12 (see FIGURE 4). This slitter has three blades 26, which project downwardly from a cross-beam 28, the blades being adjustable along the beam so that their lateral spacing on the moulder can be varied. This enables the slitter to be adjusted to suit dough pieces of different lengths.

The blades 26 may be adjustable vertically, but in any case, they are pre-set so that they are clear of the belt 12, but will dig into the rolled dough piece. As the dough piece passes the slitter, it rolls under the blades 26 and in so doing it is "necked" (i.e. the blades do not cut through the dough, but they cut slits into it). From then on it is possible to distinguish four small dough pieces joined together end-to-end, but defined lengthwise by the necks.

A straightening roller 30 is also fitted across the moulder almost at the rear end of the belt 12 (see also FIGURE 2). This roller 30 is made of metal and is wrapped by a mail chain 32 by means of which it is suspended from a fixed cross rod 34. The underside of the straightening roller is only just clear of the belt 12, so that the dough piece has to lift the roller in order to pass under it.

The use of a slitter such as the slitter 24 is known, but the straightening roller 30 is a new feature and has been found useful in the subsequent folding of the dough, because it tends to position the complete dough cylinder with its longitudinal axis at right angles to the direction of travel of the conveyor 12.

The dough folding machine 14 is fitted at the end of the moulder (see FIGURES 2 and 3). In practice, this machine is carried on brackets fixed to the moulder frame, but these brackets have been omitted in the drawings to enable the working parts to be more clearly seen.

The folding machine has a bed 42, the top surface of which slopes downwardly to the rear, and at its front end, the bed 42 has an extension 44 which fits close up to the rear end of the conveyor belt 12. Thus dough being delivered by the moulder to the folder is transferred from the belt 12 to the top surface of the bed 42, and owing to the appreciable slope of the latter, the dough piece will tend to slide off to the rear under the influence of gravity. The top of the bed is constituted by a sheet of foraminous plastics material which will be hereafter described in greater detail.

Side flanges 44 and 46 extend upwardly from the bed 42, and a top beam 48 of inverted channel cross-section extends between the side flanges. Two side boxes 50 and 52 are also provided. Each of these boxes is made of sheet metal except for the inside walls 54 which are made of foraminous plastics material similar to that used for the top surface of the bed 42. It will be noted that the upper parts of the inside walls 54 of the side boxes converge on the path of the dough between them (FIGURE 3) and that the lower parts are parallel. Each box 50, 52 rests on the bed 42 and has an upstanding L-shaped bracket 56, the arm of which rests against the front edge of the beam 48 so that the box is prevented from sliding off the rear of the bed. A screw 58 is associated with each side box. This screw has a knob 60, and passes through a laterally elongated slot 62 in the beam 48, then through a nylon nut 63 in the beam. The lower end of the screw is pointed for engagement with a dimple in the top of the box to lock the box against lateral movement. The slot 62 permits lateral adjustment of the side box when the screw 58 is slackened, and in this way the distance between the inside walls 54 of the side boxes can be adjusted.

A tongue 64 projects upwardly from the front edge of the beam 48 at the mid-length position, and a bar 66 is slidable forwardly and rearwardly in this tongue. The bar 66 carries a pneumatic cylinder 68 and can be locked in any adjusted position by tightening a screw 70 which engages in a screwed boss 72 on the beam, and has its lower end bearing on the bar 66. The pneumatic cylinder 68 is double acting, and is connected in a pneumatic circuit (not shown) controlling the operation of the folder.

A ram 69 projects downwardly from the cylinder 68, and at its lower end, this ram carries a cylindrical pin 71. In the extended position of the ram, shown in FIGURE 2, the lower end of the pin is just clear of the top surface of the bed 42, and would obstruct the passage of a dough piece on the bed.

Pivoted in the side flanges 44 and 46 is a cam shaft 74, on which are keyed two brackets 76. Each of the brackets 76 is equipped with a detection and straightening roller 78 which is positioned near to the sloping top surface of the bed 42. The shaft 74 extends through each of the side flanges, and at one side, there is a cam 80 keyed on to the shaft. This cam operates a pneumatic control valve 82, arranged in the control circuit. At the opposite side of the machine, there is a balance weight 84 which normally rests on a stop 86 and holds the cam shaft in the position illustrated.

At the lower, rear, end of the bed 42, there is a control roller 88 freely rotatable in brackets 90 fixed to the bed by bolts 92 passed through slots 94 in these brackets. The slots permit adjustment of the position of the roller 88 above the surface of the bed 42.

The pneumatic circuit supplies air under pressure via the valve 82 to the pin cylinder 68, and in the normal position, the ram 69 is kept extended by this air pressure in the position illustrated. However, when the shaft 74 is turned due to pressure on the rollers 78, the cam 80 reverses the valve 82, and the air supply is connected to the lower end of the cylinder 68, and the ram 69 retracts, lifting the pin 71 well clear of the bed 42.

When a cylindrical dough piece 100 (see FIGURE 4) emerges from the slitter 24, it is necked and comprises four small portions $a$, $b$, $c$ and $d$ all of equal length, joined end-to-end. This dough piece passes under the straightening roller 30, where it is aligned with its longitudinal axis at right angles to the direction of movement of the belt 12.

The dough piece 100 then begins to slide down the top surface of the bed 42, but it is arrested by the pin 71 which engages with the centre of the dough piece (i.e. at the middle "neck" between the small portions $b$ and $c$). At about the same time, the ends of the end portions $a$ and $d$ engage with the converging inside walls 54 at the upper ends of the side boxes 52, and the end portions are also arrested. Due to the slope of the bed 42, the four portions of the dough piece then begin to sag between the pin 71 and each wall 54 to form a W-shaped dough piece with each of the portions $a$, $b$, $c$ and $d$ forming one leg of the W.

Eventually, the leading edges of the dough piece engage with the rollers 78, and as the dough passes under these rollers they cause the cam shaft 74 to turn, and the cam 80 reverses the valve 82. This has the effect of withdrawing the pin 71 upwardly, thus releasing the dough at the centre. The dough then slides between the parallel sided portions of the walls, and the W formation is changed to one in which the four portions $a$, $b$, $c$ and $d$ lie side-by-side, with their longitudinal axes turned through 90° from the formation in which they entered the folding machine 14.

The four dough portions are then free to slide over the roller 88 into the pan 16 for final proving and baking. The uncontrolled fall of the dough from the roller 88 is only through a short distance.

It will be appreciated that it is important to prevent the dough sticking to any of the surfaces of the dough folder 14. The bed 42 is made in the form of a hollow box, and an air inlet duct 102 is connected into the underside of the box. A supply pipe (not shown) from a source of compressed air (e.g. a compressor) is attached to the duct 102 to supply air under pressure to the interior of the bed 42. It has been found that a pressure of about 5 pounds per square inch above atmospheric pressure is adequte. The top surface of the bed is constituted by a sheet of plastics material through which are drilled holes 104 approximately 1/16 inch in diameter and at rank and file spacings of 1/2 inch. The whole of the operative area of the bed surface, over which the dough piece slides is covered with the pattern of drilled holes.

When the folding machine is in operation, the air under pressure escapes from the bed 42 through these holes in a series of small jets. As the dough piece arrives on the bed, it covers some of these holes, and the air spreads out to form a thin film between the dough and the bed. In fact, under normal conditions, the dough does not actually touch the bed, but "floats" on the air film.

The side boxes 50 and 52 are also hollow, and have openings in their bottom walls which register with openings in the bed 42, so that the interior of the latter is in communication with the insides of the boxes. The inside walls 54 of the boxes are made of plastics material and drilled with holes in the same manner as the bed 42. Consequently, these walls are also air "lubricated."

The ram 69 is joined to the pin 71 by a "T" piece 106, and one end of a flexible pipe 108 is attached to the other branch of the T piece. The other end of the pipe 108 is connected to the duct 102 and the pin 71 is hollow, so that it receives the air under pressure from the duct. Small holes 110 are formed in the surface of the pin 71, so that it too is air lubricated.

Thus all the surfaces of these members which would otherwise contact the dough in the folding machine (and which are referred to as manipulation members) are air lubricated, and there is no tendency for the dough to stick to these surfaces. Instead of forming the manipulation surfaces of solid walls with drilled holes, the same lubrication effect could be obtained by forming the walls of air pervious plastics material.

The apparatus shown in FIGURES 1 to 3, can be used to pan single piece bread (i.e. the placing of a single unnecked dough piece in a baking pan with its longitudinal axis parallel with the length of the pan). For this purpose, the slitter 24 is removed and the pin 71 is locked in its retracted position by a manual override switch. The side boxes 50 and 52 are adjusted so that the distance between the lower, parallel, portions of their inside walls 54 is equal to the length of the dough piece required.

The dough piece is moulded and coiled as previously described, and is straightened by the roller 30. It then slides down the bed 42 and is partially arrested by the rollers 78 to realign the dough piece and enable it to slide accurately into its seating in the pan. The bed 42 and side walls 54 are fluidised as previously described to prevent the dough piece sticking to them.

Referring now to the folding machine illustrated in FIGURE 6, there is illustrated an open topped box 120, in which an elongated dough piece 122 is received from a dough moulder. The dough has to be cross panned and so has to be formed first into a W formation, and then into the four side-by-side portions. On the moulder it will have been necked as previously described into the portions a, b, c and d.

The box 120 is rectangular in plan view and has fixed side walls 124, 126 but its end walls 128, 130 are movable longitudinally towards and away from each other between the side walls, and its bottom 132 is slidable to one side. The side wall 126 has three vertical slots 134, 136 and 138, one at the centre of its length and one near to each end, and a manipulator plate 140 outside this wall carries three manipulator blades 142, 144 and 146 which project into the slots. The manipulator plate is movable inwardly and outwardly and in its innermost position, its manipulators project almost to the opposite side wall 124 of the box. The other side wall 174 has two vertical slots 148 and 150 aligned with the two outer blades of the slitter on the moulding machine. Another manipulator plate 152 has two manipulators 154 and 156 which project through these two slots. When these two manipulators are projected, they engage with the dough piece in the zones of the two outer slits. Both end walls 128, 130, the bottom wall 132 and the manipulator plates 140 and 157 are connected to the rams of pneumatic cylinders 158, and there are suitable pneumatic controls (not shown) adapted to operate the movable parts of the box in timed relationship with the dough moulding.

The dough piece may contact any of the inside walls of the box, it will certainly contact the bottom 132 and the manipulators. All of these surfaces, which are or can be engaged by the dough, are covered with a finely porous material, and air under light pressure (of the order of five pounds per square inch above atmospheric) is piped to the rear of all these faces. As a result, the air escapes all over the manipulating surfaces and forms a thin continuous film over these surfaces. This prevents the dough sticking to these surfaces, and in fact it provides in effect a thin "lubricating" film, so that the dough does not actually engage with the surfaces.

After the dough piece has dropped into the box, the two manipulator plates 140 and 152 move inwardly. The manipulators then fold the dough into the W formation and withdraw. Then the end walls 128 and 130 move inwardly squashing the W and finally the bottom 132 slides to one side, allowing the dough to drop into a pan which has been positioned below the moulding box 140 on the usual conveyor.

It will be appreciated that the "lubrication" of the manipulating surfaces is essential to the effectiveness of the dough molding box, because the operations just described could not be carried out if the dough were to stick to any of the manipulating surfaces.

In the alternative arrangement illustrated in FIGURE 7, the dough moulding machine is adapted to sheet the dough and then to cut two longitudinal slits in the sheet, partially dividing it into three parts e, f, g of equal width. A conveyor then slides this sheet on to a folding bed 160. This comprises a fixed central plate 162, and two side plates 164 and 166 hinged along their longitudinal edges to the fixed plate. The central plate is approximately the same width as the width of one of the three portions of the dough sheet.

In their normal positions, the side plates lie with their top surfaces level with the top surface of the central fixed plate (as shown), but the side plates are connected to pneumatically driven mechanism (not shown) for turning them over on to the centre plate. This mechanism is timed so that the side plate 164 operates and returns to its set position before the plate 166 operates. All the top surfaces of the plates are covered with air permeable plastics material, and there is an air supply connected as in the previous examples.

In use, after the dough sheet arrives on the bed, the side plate 164 folds its portion e of the dough sheet over on to the centre portion f, and then the other side plate 166 folds its portion g of the dough sheet over on to the two pieces already on the centre plate. This gives a three layer dough piece ready for further processing. Again, it will be appreciated that the "lubrication" of the bed is essential to the success of the folding method.

In the third arrangement shown in FIGURE 8, one or both rollers of a pair of dough squeezing rollers 170, 172 has its cylindrical surface covered with the air permeable material. In fact, this roller is made of a tube of the air permeable material screwed on to the end adapters. The roller shaft 174 is then bored from one end and an outlet hole 176 is drilled through the side of the shaft into the bore. The open end of the bore is connected to an air supply so that the air can be pumped into the roller and will escape through its cylindrical surface. This arrangement prevents the dough from sticking to the roller.

Obviously, the air film lubrication could be applied to other kinds of dough manipulating members.

I claim:
1. Apparatus for handling soft tacky dough of the type which has a tendency to stick to surfaces with which it comes in contact comprising a machine for folding a relatively soft flexible body of said dough, said machine comprising means providing at least three dough manipulators adapted to substantially simultaneously engage respectively the ends and an intermediate portion of said dough body, means providing gas permeable dough contacting surfaces on the manipulators for engaging the ends of said dough body, and means for supplying gas under pressure to discharge through said gas permeable surfaces for establishing and maintaining a continuous lubricant film of gas between the dough body and said end-engaging manipulator surfaces during passage of the folding dough body through said machine.

2. The apparatus for handling dough as recited in claim 1, in which the manipulator for engaging the intermediate portion of said dough body also has a gas permeable dough engaging surface, and means is provided for supplying gas under pressure to discharge through said intermediate manipulator surface.

3. Apparatus for handling dough as recited in claim 2, in which said gas permeable surfaces comprise walls of plastic material on each said manipulator.

4. Apparatus for handling dough as recited in claim 2, in which a series of spaced apart small gas discharge holes are formed through the gas permeable surfaces of the respective manipulators to provide permeability.

5. Apparatus for handling dough as recited in claim 2, in which the gas permeable surfaces of said manipulators are made of inherently gas permeable material.

6. Apparatus for handling dough as recited in claim 2, in which said means for supplying gas to said surfaces comprising means for connecting a source of compressed air to chambers at the sides of said manipulators opposite the dough contacting sides.

7. In the dough handling apparatus defined in claim 2, said three manipulators being respectively an intermediate support member and relatively movable side support members whereby a sheeted dough body may be manipulated by lateral folding upon itself by movement of said side supports.

8. Apparatus for handling dough as recited in claim 1, wherein said end-engaging manipulators have converging gas-permeable surfaces, one at each side of a traversing path for the dough body through the folding machine.

9. Apparatus for handling dough as recited in claim 8, in which said converging surfaces are fixed walls, and means is provided for passing an elongated dough body between said fixed walls with its intermediate portion engaged by the intermediate manipulator, whereby the end parts of the moving dough body are retarded relatively to the intermediate portion.

10. Apparatus for handling dough as recited in claim 9, in which said intermediate manipulator comprises a movable finger for temporary stationary engagement with the intermediate part of the dough body to cause that intermediate part to be retarded relatively to the portions between itself and the end parts engaging said fixed walls, so that the dough can be formed into a substantially W formation.

11. Apparatus for handling dough as recited in claim 10, in which said finger has a gas-permeable surface in the path of said dough body.

12. Apparatus for handling dough as recited in claim 8, in which there is provided a supporting member for the dough body as it passes between said converging surfaces, the supporting member having a gas-permeable surface for underlying the moving folding dough body, and there being means for discharging gas under pressure through said underlying surface.

13. Apparatus for handling dough as recited in claim 12 in which said supporting member has a portion inclined to the horizontal so that the dough body is assisted in its passage between said converging walls by gravitational force.

14. Apparatus for handling dough as recited in claim 1, wherein said folding machine is situated at the output end of a dough molder equipped with blades to intermediately score the dough body on its way to the folding machine to facilitate the folding action.

15. In a method of handling dough wherein a relatively soft tacky flexible body of dough is folded upon itself during movement along a path wherein respective end and intermediate portion contact corresponding relatively movable end and intermediate manipulator surfaces, the step of discharging air under pressure through said surfaces to provide continuous films of air between said surfaces and the dough body during folding and passage of said dough body to lubricate passage and folding of said dough body and to prevent the dough body from sticking to said surfaces.

References Cited

UNITED STATES PATENTS

| | | | |
|---|---|---|---|
| 2,261,043 | 10/1941 | Winfree | 107—9 |
| 2,438,811 | 3/1948 | Le Sage | 107—9 |
| 2,596,313 | 5/1952 | Wagoner. | |
| 2,387,886 | 10/1945 | Devol. | |

WALTER A. SCHEEL, Primary Examiner

R. I. SMITH, Assistant Examiner

U.S. Cl. X.R.

18—5; 101—54; 107—30, 68